United States Patent
Ahn

(10) Patent No.: US 11,367,283 B2
(45) Date of Patent: Jun. 21, 2022

(54) ELECTRONIC DEVICE AND CONTROL METHOD THEREOF

(71) Applicant: SAMSUNG ELECTRONICS CO., LTD., Suwon-si (KR)

(72) Inventor: Young Chun Ahn, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/754,962

(22) PCT Filed: Oct. 26, 2018

(86) PCT No.: PCT/KR2018/012827
§ 371 (c)(1),
(2) Date: Apr. 9, 2020

(87) PCT Pub. No.: WO2019/088592
PCT Pub. Date: May 9, 2019

(65) Prior Publication Data
US 2020/0302182 A1   Sep. 24, 2020

(30) Foreign Application Priority Data

Nov. 1, 2017 (KR) .................. 10-2017-0144882

(51) Int. Cl.
*G06K 9/62* (2022.01)
*G06T 7/73* (2017.01)
(Continued)

(52) U.S. Cl.
CPC .............. *G06V 20/46* (2022.01); *G06T 7/13* (2017.01); *G06T 7/70* (2017.01); *G06V 10/40* (2022.01);
(Continued)

(58) Field of Classification Search
None
See application file for complete search history.

(56) References Cited

U.S. PATENT DOCUMENTS 8,103,107 B2   1/2012 Yamamoto
8,810,599 B1 * 8/2014 Tseng .................. G05D 1/0246
                                                        345/633
(Continued)

FOREIGN PATENT DOCUMENTS

JP       11-167583        6/1999
JP       2008-176538      7/2008
(Continued)

OTHER PUBLICATIONS

International Search Report for PCT/KR2018/012827 dated Feb. 14, 2019, 5 pages with English Translation.
(Continued)

*Primary Examiner* — Oneal R Mistry
*Assistant Examiner* — Nicolas James Boyajian
(74) *Attorney, Agent, or Firm* — Nixon & Vanderhye, PC.

(57) ABSTRACT

An electronic device is disclosed. The electronic device includes a communicator configured to receive a video consisting of a plurality of frames, a processor configured to sense a frame having a predetermined object in the received video, extract information from the sensed frame, and generate metadata by using the extracted information, and a memory configured to store the generated metadata.

11 Claims, 11 Drawing Sheets

(51) Int. Cl.
*G06V 10/40* (2022.01)
*G06V 30/262* (2022.01)
*G06V 30/10* (2022.01)
*G06V 20/40* (2022.01)
*G06T 7/13* (2017.01)
*G06T 7/70* (2017.01)

(52) U.S. Cl.
CPC .... *G06T 2207/10016* (2013.01); *G06V 30/10* (2022.01)

(56) References Cited

U.S. PATENT DOCUMENTS

| | | | |
|---|---|---|---|
| 2008/0143880 A1 | 6/2008 | Jung et al. | |
| 2008/0175486 A1* | 7/2008 | Yamamoto | G06F 16/7844 382/206 |
| 2008/0187219 A1* | 8/2008 | Chen | H04N 7/18 382/173 |
| 2010/0211584 A1* | 8/2010 | Wang | G06F 16/70 707/758 |
| 2014/0068650 A1 | 3/2014 | Kim et al. | |
| 2015/0010288 A1 | 1/2015 | Aggarwal et al. | |
| 2016/0036882 A1* | 2/2016 | Jin | G06F 9/50 709/231 |
| 2016/0055380 A1* | 2/2016 | Schmitz | G06F 16/783 386/241 |
| 2017/0188091 A1 | 6/2017 | Diggins | |
| 2017/0206929 A1* | 7/2017 | Jo | H04N 9/8042 |
| 2017/0300754 A1* | 10/2017 | Ohm | G06K 9/6227 |

FOREIGN PATENT DOCUMENTS

| | | |
|---|---|---|
| JP | 4796377 | 10/2011 |
| JP | 4937218 | 5/2012 |
| KR | 10-2004-0033767 | 4/2004 |
| KR | 10-0589823 | 6/2006 |
| KR | 10-2007-0061160 | 6/2007 |
| KR | 10-0836197 | 6/2008 |
| KR | 10-2014-0029982 | 3/2014 |
| KR | 10-2015-0004681 | 1/2015 |
| KR | 10-2015-0005131 | 1/2015 |
| KR | 10-2016-0148875 | 12/2016 |

OTHER PUBLICATIONS

Written Opinion of the ISA for PCT/KR2018/012827 dated Feb. 14, 2019, 9 pages with English Translation.

Office Action dated Dec. 13, 2021 in Korean Patent Application No. 10-2017-0144882 and English-language translation.

* cited by examiner

FIG. 4
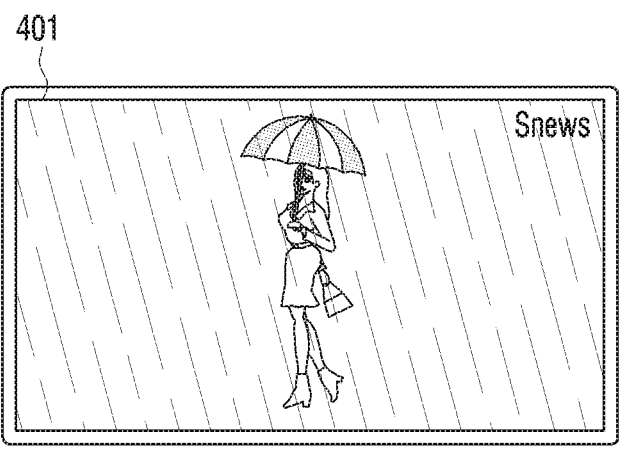
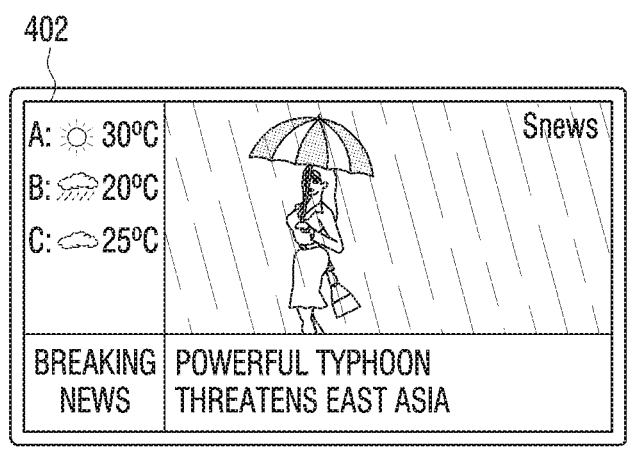

FIG. 6

| | 610 | 620 | 630 | 640 | 650 | 660 |
|---|---|---|---|---|---|---|
| | CONTENTS NAME | GENRE | SUBGENRE | TIME | TEXT | IMAGE |
| 601 | Snews | NEWS | WEATHER | 17-07-01 21:00:05 | BREAKING NEWS POWERFUL TYPHOON THREATENS EAST ASIA | PERSON, UMBRELLA, RAIN |

| | CONTENTS NAME | GENRE | SUBGENRE | TIME | TEXT | IMAGE |
|---|---|---|---|---|---|---|
| 602 | Snews | NEWS | WEATHER | 17-07-01 21:00:25 | BREAKING NEWS POWERFUL TYPHOON KILL 30 PEOPLE | PERSON, UMBRELLA, RAIN |

| | CONTENTS NAME | GENRE | SUBGENRE | TIME | TEXT | IMAGE |
|---|---|---|---|---|---|---|
| 603 | Snews | NEWS | WEATHER | 17-07-01 21:00:28 | BREAKING NEWS POWERFUL TYPHOON THREATENS EAST ASIA KILL 30 PEOPLE | PERSON, UMBRELLA, RAIN |

FIG. 7
| CONTENTS NAME | GENRE | SUBGENRE | TIME | TEXT | IMAGE |
|---|---|---|---|---|---|
| Snews | NEWS | WEATHER | 17-07-01 21:00:05 | BREAKING NEWS POWERFUL TYPHOON THREATENS EAST ASIA | PERSON, UMBRELLA, RAIN |
↓ 20m later
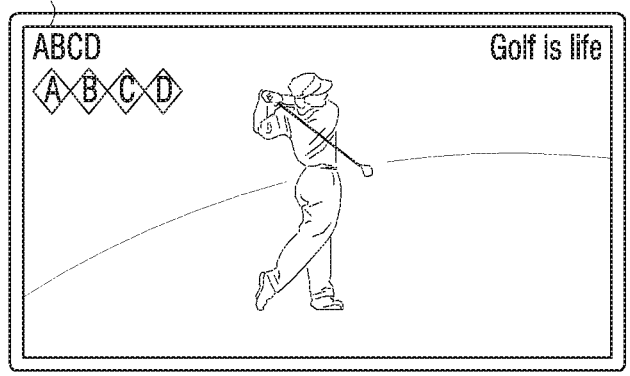
| CONTENTS NAME | GENRE | SUBGENRE | TIME | TEXT | IMAGE |
|---|---|---|---|---|---|
| ADVERTISEMENT | SPORTS | GOLF | 17-07-01 21:20:05 | ABCD Golf is life | ABCD |

ELECTRONIC DEVICE AND CONTROL METHOD THEREOF

This application is the U.S. national phase of International Application No. PCT/KR2018/012827 filed Oct. 26, 2018 which designated the U.S. and claims priority to Korean Patent Application No. 10-2017-0144882 filed Nov. 1, 2017, the entire contents of each of which are hereby incorporated by reference.

FIELD

The present application relates to an electronic device and a control method thereof, and more particularly, to an electronic device that senses a frame having a predetermined object in a received video and extracts information from the sensed frame, and a control method thereof.

DESCRIPTION OF RELATED ART

An artificial intelligence system is a computer system that realizes human-level intelligence, and the machine learns and determines by itself, and its recognition rate increases as it is used.

The artificial intelligence technology consists of machine learning (deep learning) technology that uses an algorithm which classifies/learns features of input data by itself, and element technologies that simulate functions of human brain cognition, determination, etc. by utilizing a machine learning algorithm.

The element technology may include at least one of, for example, linguistic understanding technology for recognizing human language/characters, visual understanding technology for recognizing objects as human vision, reasoning/prediction technology for determining, logically inferring and predicting information, a knowledge expression technology for processing human experience as knowledge data and motion control technology that controls autonomous driving of vehicles and a movement of a robot.

As an example of the use of such artificial intelligence technology, there have been various methods of extracting text information or image information included in a video. However, since the video is composed of many frames, storing data extracted from all frames has a limitation in terms of memory capacity, and there has been a problem in that unnecessary information is stored even when using a cloud server.

In addition, analyzing the data extracted from all frames takes a long time and there has been a problem in that the accuracy of the analysis is deteriorated because even unnecessary information was stored.

SUMMARY

The present application is designed to improve the problems described above, and an object of the present application is to provide an electronic device for extracting information by sensing a frame having a predetermined object in a received video, and a control method thereof.

An aspect of the embodiments relates to an electronic device including a communicator configured to receive a video consisting of a plurality of frames, a processor configured to sense a frame having a predetermined object in the received video, extract information from the sensed frame, and generate metadata by using the extracted information, and a memory configured to store the generated metadata.

The processor may be configured to detect an edge area from the frame, and based on the detected edge area being greater than or equal to a predetermined length, identify that the predetermined object is included.

The processor may be configured to generate one metadata by merging information extracted from different frames.

The processor may be configured to compare information extracted from different frames and identify that a content has been changed based on no common information being existed.

The processor may be configured to sense text included in the frame to extract information.

The processor may be configured to extract an object image included in the frame, and extract object information with respect to the extracted object image.

The processor may be configured to extract text itself as information based on the object included in the frame being text, and extract a content that the image refers to based on the object included in the frame being an image.

The processor may be configured to generate metadata including at least one among company information, time information, and genre information by using the extracted information.

The processor may be configured to detect metadata included in the image, and compare the detected metadata with the extracted information in order to modify the detected metadata.

The processor may be configured to select preferred content by using the stored metadata.

An aspect of the embodiments relates to a control method of an electronic device including receiving a video consisting of a plurality of frames, sensing a frame having a predetermined object in the received video, extracting information from the sensed frame, generating metadata by using the extracted information, and storing the generated metadata.

The sensing may include detecting an edge area from the frame, and, based on the detected edge area being greater than or equal to a predetermined length, identifying that the predetermined object is included.

The generating the metadata may include generating one metadata by merging information extracted from different frames.

The method may further include comparing information extracted from different frames and identifying that a content has been changed based on no common information being exited.

The extracting may include sensing text included in the frame to extract information.

The extracting may include extracting an object image included in the frame, and extracting object information with respect to the extracted object image.

The extracting may include extracting text itself as information based on the object included in the frame being text, and extracting a content that the image refers to based on the object included in the frame being an image.

The generating may include generating metadata including at least one among company information, time information, and genre information by using the extracted information.

The method of an electronic device may further include detecting metadata included in the video, the generating may include comparing the detected metadata and the extracted information to modify the detected metadata.

The method may further include selecting preferred content by using the stored metadata.

BRIEF DESCRIPTION OF THE DRAWINGS

FIGS. 3, 4, and 5 are views illustrating a predetermined object included in a video;

FIGS. 6 to 7 are views illustrating a metadata generation operation according to an embodiment of the disclosure;

DETAILED DESCRIPTION OF EXAMPLE EMBODIMENTS

Figure 1:
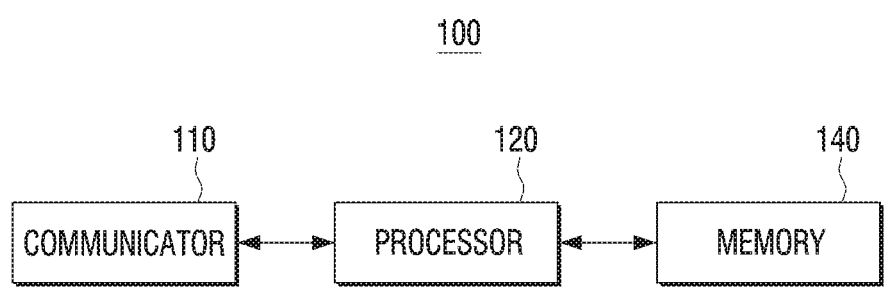
FIG. 1 is a block diagram schematically illustrating a configuration of an electronic device according to an embodiment of the disclosure.

Before specifically describing the present application, a method for demonstrating the present application and drawings will be described.

With respect to the terms used in an exemplary embodiment, general terms currently widely used are selected in view of function with respect to various exemplary embodiments. However, these terms may vary depending on intention, legal or technical interpretation, emergence of new technologies, and the like of those skilled in the related art. Further, some of the terms may be ones arbitrarily selected by the applicant. Unless there is a specific definition of a term, the term may be construed based on the overall contents and technological common sense of those skilled in the related art.

Further, the same reference numerals or symbols used in the drawings accompanied with the disclosure refer to components or elements that perform substantially the same functions. For convenience of explanation and understanding, the same reference numerals or symbols are used in describing different embodiments. That is, the same reference numerals in a plurality of drawings do not necessarily mean that the drawings are directed to one same embodiment.

Further, terms including ordinal number such as "first," "second," and so on may be used in the description and the claims in order to distinguish among elements. The ordinal numbers are used in order to distinguish the same or similar elements from one another, and the use of the ordinal number should not be understood as limiting the meaning of the terms. For example, an element combined with an ordinal number is not limited because of the ordinal number in the order the element is being used, in the order the element is being disposed, and so on. When necessary, the numerical expressions may be exchanged between components.

The singular expression also includes the plural meaning as long as it does not differently mean in the context. The terms, "include", "comprise", "is configured to", etc. of the description are used to indicate that there are features, numbers, steps, operations, elements, parts or combination thereof, and they should not exclude the possibilities of combination or addition of one or more features, numbers, steps, operations, elements, parts or combination thereof.

The embodiments of the present disclosure may vary, and may be provided in different embodiments. Specific embodiments will be described with reference to accompanying drawings and be described in detail in the specific description. However, this does not necessarily limit the scope of specific embodiments forms. Instead, modifications, equivalents and replacements included in the disclosed concept and technical scope of this specification may be employed. While describing embodiments, if it is determined that the specific description regarding a known technology obscures the gist of the disclosure, the detailed description may be omitted.

Terms such as first and second may be used to describe various elements, but the elements should not be limited by terms. The terms are used only to distinguish one element from other elements.

Terms used in the present application are only used to describe specific embodiments, and are not intended to limit the scope of rights. The singular expression also includes the plural meaning as long as it does not differently mean in the context. The terms, "include", "comprise", "is configured to", etc. of the description are used to indicate that there are features, numbers, steps, operations, elements, parts or combination thereof, and they should not exclude the possibilities of combination or addition of one or more features, numbers, steps, operations, elements, parts or combination thereof.

The term such as "module," "unit," "part", and so on is used to refer to an element that performs at least one function or operation, and such element may be implemented as hardware or software, or a combination of hardware and software. Further, except for when each of a plurality of "modules", "units", "parts", and the like needs to be realized in an individual hardware, the components may be integrated in at least one module or chip and be realized in at least one processor.

Further, in embodiments of the present disclosure, when it is described that a portion is connected to another portion, the portion may be either connected directly to the other portion, or connected indirectly via another medium. Further, when a certain portion includes a certain element, unless specified to the contrary, this means that another element may be additionally included, rather than precluding another element.

FIG. 1 is a block diagram schematically illustrating a configuration of an electronic device according to an embodiment.

Referring to FIG. 1, the electronic device 100 may include a communicator 110, a processor 120, and a memory 140.

The electronic device 100 may be implemented with various devices such as a computer, a TV, a set top box, a smartphone, and a smartwatch. For example, the electronic device 100 may be implemented as an analog TV, a digital TV, a 3D-TV, a smart TV, an LED TV, an OLED TV, a plasma TV, a monitor, a curved TV having fixed curvature screen, a flexible TV having fixed curvature screen TV, a bended TV having a fixed curvature screen, and/or a curvature-variable TV capable of changing the curvature of a current screen by a received user input, but is not limited thereto.

The communicator 110 is a component that performs communication with various types of external devices according to various types of communication methods. The communicator 110 may receive an image composed of a plurality of frames from the outside.

The processor 120 controls the overall operation of the electronic device 100. For example, the processor 120 may sense (or identify) frame having a predetermined object from the received image.

The predetermined object may mean a specific object capable of grasping information of content.

The content may be, for example, a broadcast channel, broadcast content (e.g., VOD, streaming content (video, music, etc.)), or a plurality of applications, functions, etc. that may be executed in the electronic device 100. In other words, the history information may include, for example, information on when a specific broadcast channel was viewed and how long it has been viewed, information on when a specific application was used and how long it was used, and information on when a specific content was viewed and how long it was viewed. The disclosure is not limited to the examples described above, and various history information may be stored in the memory 110 according to what content the electronic device 100 provides.

The predetermined object may mean a specific object including information on the content described above. The electronic device 100 may store the predetermined object and a method of storing may be various. For example, the predetermined object may be stored as a user's setting and may be automatically stored through AI learning. Detailed description of artificial intelligence learning will be described later in FIG. 10.

The processor 120 may store the predetermined object in advance. The processor 120 may automatically store a specific object including meaningful information in memory, preferably through artificial intelligence learning.

Various experimental data are analyzed for a predetermined object according to another embodiment of the disclosure, and a part of it is described. As described above, the predetermined object may mean an object including meaningful information and may be an area generally including text information. Areas including text information are generally meant to convey information to users through text. Therefore, the area including the text information is likely to include meaningful information, and the processor 120 may store the area including the text information as the predetermined object.

The area including text information means an object capable of predicting that text may be included even if a content of the text is not accurately understood using OCR technology. For example, when there is an area in which a pixel value having one color information is repeatedly displayed in a certain part, the processor 120 may identify the part as an area including text information. This is only an example, and if an object containing text may be specified, it may be stored as the predetermined object.

The processor 120 may detect an edge area in the frame and identify that the predetermined object is included when the detected edge area is greater than or equal to a predetermined length. A detailed description of the edge area will be described later with reference to FIG. 3.

The processor 120 may extract information by sensing the text included in the frame. The processor 120 may extract an object image included in the frame, and extract object information on the extracted object image as information. When the object included in the frame is text, the processor 120 may extract the text itself as information, and when the object included in the frame is an image, a content of the image may be extracted as information. A detailed method of extracting information on images and text will be described later in FIG. 3.

Further, the processor 120 may store an object having the same pixel value for a predetermined time as a predetermined object. Generally, an object having the same pixel value for a certain period of time may be information representing a broadcaster. The detailed description will be described later with reference to FIG. 8.

The processor 120 may store an object in which an image and text are combined as a predetermined object. Generally, an object in which an image and text are combined may correspond to a trademark. Therefore, when the processor 120 stores a specific object representing a trademark as a predetermined object, it may be highly likely to extract information about the trademark.

The processor 120 may compare information extracted from different frames and identify that the content has been changed if there is no common information. The detailed operation will be described later in FIG. 7.

The processor 120 may extract information from the detected frame and generate metadata using the extracted information. In this case, the processor 120 may generate metadata including at least one of a company name, time information, and genre information using the extracted information. In addition, the processor 120 may generate information by merging information extracted from different frames. The detailed description of the metadata generation will be described later in FIG. 6.

The processor 120 may receive meta data included in a video. The meta data included in the video may include information about content, such as electronic program guide (EPG) metadata.

The processor 120 may grasp start time and end time of the video received by the electronic device 100 using the information extracted from the received video. For example, the processor 120 may detect a frame having a predetermined object from the video received by the electronic device and extract information from the frame. Whether the content has been changed may be confirmed by comparing the extracted information.

For example, if the text "Next time" is displayed on the video received by the electronic device 100 and the processor 120 extracts the information, the processor 120 may identify that the video currently received by the electronic device 100 is finished. Unlike information included in the general EPG metadata, the processor 120 may grasp the exact end time of the video currently received by the electronic device 100.

In addition, it is assumed that the processor 120 recognizes the video received by the electronic device 100 as advertisement content and the content name is displayed on the upper right. The processor 120 may identify that the content starts soon when the content name displayed on the upper right of the advertisement video received by the electronic device 100 disappears. In order to identify the exact start time, the processor 120 may identify that the content name displayed on the upper right of the advertisement video disappears and new content starts when the advertisement video ends.

The processor 120 may accurately grasp the start time and the end time of the content received by the electronic device 100 using various objects capable of grasping the start and end of the content in addition to the above embodiments, or extracted information.

The processor 120 may accurately identify the start time and end time of specific content and compare it with information included in the previously received EPG metadata. In addition, when the time information included in the previously received EPG metadata is wrong, the processor 120 may modify time information of the existing EPG metadata based on the time information identified by the processor 120.

In the embodiments described above, time information is compared and modified, but comparison and modification may also be possible in other information. The processor 120 may compare information included in EPG metadata. For example, the processor 120 may compare information included in the received metadata with information extracted from the received video. If there is a difference between the information included in the received metadata and the information extracted from the received video, the processor 120 may modify the received metadata based on the information extracted from the received video.

For example, the processor 120 may extract information about content included in EPG metadata, and the EPG metadata may include time information and content information. The processor 120 may predict a content of the content currently provided to the electronic device 100 based on the information included in the EPG metadata.

However, there may be a case where the information included in the EPG metadata and the content received by the actual electronic device 100 are different. For example, it is assumed that the information starting a news program on channel 11 at 8 pm on Saturday is included in the EPG metadata. In addition, the broadcaster in charge of channel 11 tried to start the news program on channel 11 at 8 pm on Saturday, but the news program will be extended to 9 pm to broadcast sports game live at 8 pm on Saturday.

When a user watches channel 11 at 8 pm on Saturday, the user will watch the sports game differently from the information (news program) stored in the EPG metadata. Therefore, there may be an error between the information stored in the EPG metadata and the content actually received by the electronic device.

The processor 120 may compare information included in the EPG metadata with content provided by the actual electronic device 100. For example, the processor 120 may sense a frame having a predetermined object from the received image, extract information from the sensed frame, and compare information with the EPG metadata corresponding to the received video.

In the above embodiment, it is assumed that the electronic device 100 has received the information included in the EPG metadata that the news program starts at 8 PM on Saturday. However, because the actual video received by the electronic device 100 is the sports game, the processor 120 may identify that there is a difference between information extracted from the received video and the information of the received EPG metadata. The processor 120 may modify information on the existing received EPG metadata. For example, the processor 120 may modify the information on which the news program starts at 8 PM on Saturday, to the information on which the sports game starts at 8 PM.

Also, the processor 120 may store the modified EPG metadata in the memory 140.

In the embodiment described above, it is assumed that a situation in which the sports game is broadcast live different from the information (news program) included in the EPG metadata, but this is only an embodiment, a video different from the information included in the EPG metadata may be received by the electronic device 100 for various reasons. For example, the various reasons may be errors in EPG metadata, urgent changes of broadcaster contents, and breaking news, or the like, and are not limited to any particular embodiment.

Also, the processor 120 may select preferred content using the stored metadata. The detailed description will be described later in FIG. 9.

As described above, the electronic device 100 according to an embodiment of the disclosure may extract information only from a frame including a predetermined object among the received frames, thereby reducing burdens for the processor 120 and the memory 140.

In addition, since information is extracted only for a specific frame, unnecessary information is not stored in the memory 140, so an accuracy of an analysis result (e.g., metadata) may be increased.

In addition, the processor 120 may store accurate information in real time through an operation of modifying meta data transmitted from the outside.

The memory 140 may store various data, programs or applications for driving and controlling a remote control device 100 under a control of a control unit. For example, the memory 140 may store text information or image information extracted from the frame. The stored text information or image information may be used to generate metadata. Alternatively, it may be used for comparison with externally received metadata.

The memory 140 may store metadata generated by the processor 120.

In addition, information on preferred content to be recommended to a user may be stored in the memory 140. When there is a specific event, the processor 120 may provide the user with the preferred content, and the electronic device 100 may use information about the preferred content stored in the memory 140.

In the description of FIG. 1, it has been described that the electronic device 100 identifies whether a frame includes a predetermined object, but the identified operation may also be implemented in a form performed by an external server when implementing. In addition, in addition to the operation of identifying the predetermined object, an operation of extracting text and images from a specific frame may also be implemented in a form of performing in an external server.

For example, an operation that requires analysis after receiving a video may be implemented as being performed by a server. In addition, some may be performed in the electronic device 100 and some may be performed by the server by distinguishing necessary operations between the electronic device 100 and the server.

Only a simple configuration of the communicator 110, the processor 120, and the memory 140 has been illustrated and described, but various configurations may be additionally provided when implementing. This will be described below with reference to FIG. 2.

Figure 2:
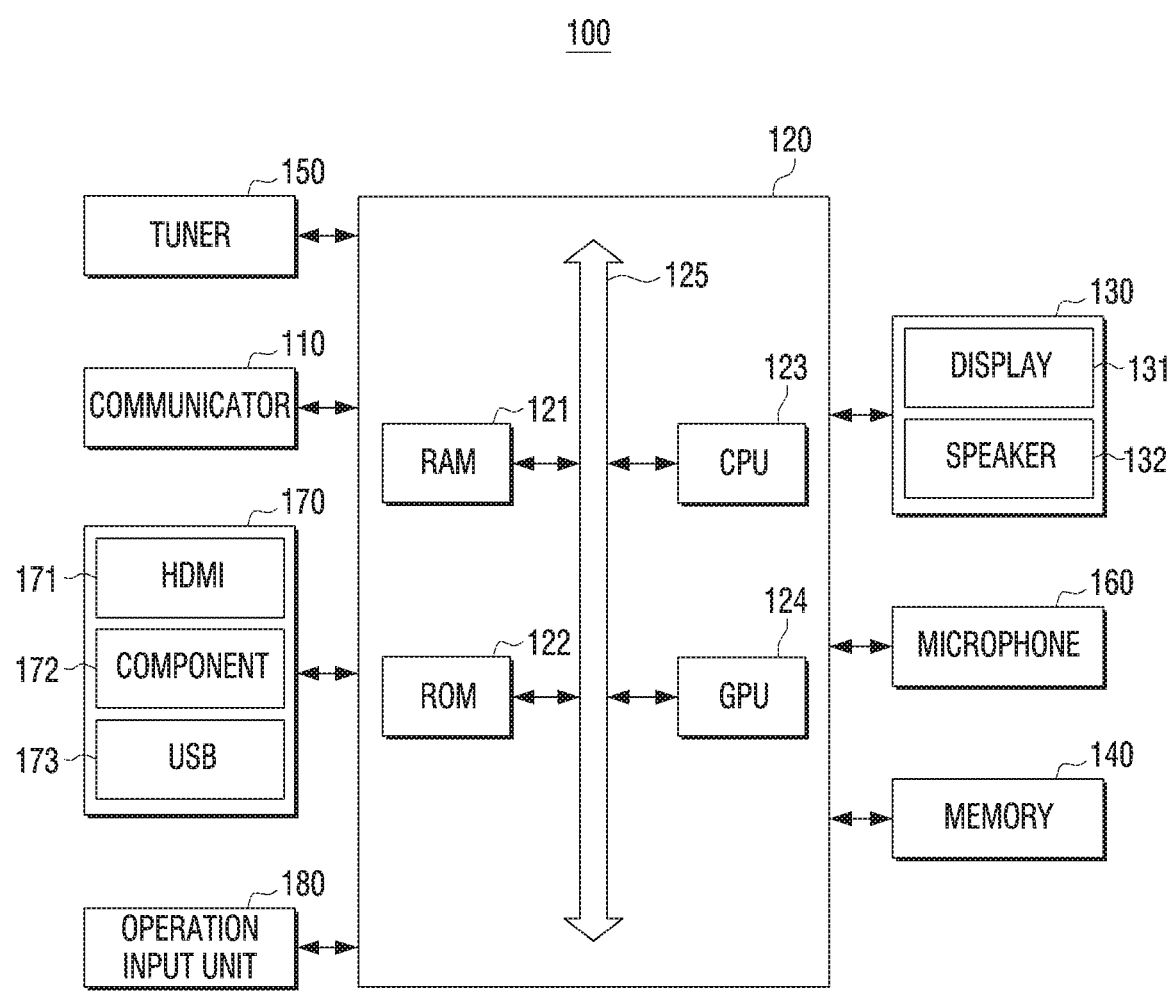
FIG. 2 is a block diagram illustrating a configuration of an electronic device in detail according to an embodiment of the disclosure.

FIG. 2 is a block diagram illustrating a configuration of an electronic device in detail according to an embodiment of the disclosure.

Referring to FIG. 2, the electronic device 100 includes a communicator 110, a processor 120, an output unit 130, a memory 140, a tuner 150, a microphone 160, a port unit 170, and operation input unit 180.

The electronic device 100 may receive a voice through a built-in microphone or a microphone built in an external device to directly recognize the voice, or transmit the voice input to an external server performing voice recognition to receive the voice recognition result.

When the electronic device 100 directly performs voice recognition, an artificial intelligence system for recognizing voice may be provided. The artificial intelligence system is a computer system that realizes human-level intelligence, and the machine learns and identifies itself, and a recognition rate increases as it is used. Among the artificial intelligence technologies, input voice may be recognized through linguistic understanding technology that recognizes human language/text. Linguistic understanding is a technology that recognizes and applies/processes human language/characters, and includes natural language processing, machine translation, conversation system, question and answer, speech recognition/synthesis, and the like.

According to another embodiment of the disclosure, there is a separate external device with a built-in microphone, and the external device may provide a voice recognition result to the electronic device 100 by performing voice recognition processing on the input voice.

The electronic device 100 may be controlled based on a result of voice recognition. For example, if the voice recognition result includes "recommend channel", a preferred channel may be selected and information on the selected preferred channel may be provided through the output unit 130. In this case, it may be a specific program or specific content instead of a channel.

The communicator 110 is a component that performs communication with various types of external devices according to various types of communication methods. The communicator 110 may receive advertisement information related to content provided by the electronic device from an external server.

The communicator 110 may be connected to an external device through a local area network (LAN) or an internet network, and may be connected to the external device through wireless communication (e.g., Z-wave, 4LoWPAN, RFID, LTE D2D, BLE, GPRS, Weightless, Edge Zigbee, ANT+, NFC, IrDA, DECT, WLAN, Bluetooth, Wi-Fi, Wi-Fi Direct, GSM, UMTS, LTE, WiBRO, etc.). The communicator 110 may include various communication chips such as a Wi-Fi chip, a Bluetooth chip, an NFC chip, a wireless communication chip, or the like. The Wi-Fi chip, the Bluetooth chip, and the NFC chip perform communication using a Wi-Fi method, a Bluetooth method, and an NFC method, respectively. The wireless communication chip refers to a chip that performs communication according to various communication standards such as IEEE, Zigbee, 3rd generation (3G), 3rd generation partnership project (3GPP), long-term evolution (LTE), or the like. In addition, the communicator 110 may include an optical receiver capable of receiving a control signal (e.g., IR pulse) from an external device. A user command input from an external device may be received through the communicator 110, information on the recommended service selected through the communicator 110 may be transmitted to an external user terminal, and data may be transmitted and received with the server 200 through the communicator 110.

The processor 120 includes a RAM 121, a ROM 122, a CPU 123, a GPU 124, and a bus 125. The RAM 121, the ROM 122, the CPU 123, and the GPU 124 may be connected to each other through the bus 125. The processor 120 may be implemented with a system on chip (SoC).

The GPU 124 of the processor 120 may analyzes a video and the CPU 123 may control the overall operation.

The CPU 123 accesses the memory 140 and uses the O/S stored in the memory 140 to boot, and performs various operations using various programs, contents, data, etc. stored in the memory 140. The CPU 123 may perform the operation of the processor 120 described with reference to FIG. 1.

When the booting of the display device 100 is completed, the GPU 124 may provide a screen including various objects such as icons, images, text, or the like. The GPU configuration may be configured as a separate configuration such as a video processor, or may be implemented as a configuration such as an SoC combined with a CPU in the processor 120.

The ROM 122 stores a set of commands for booting the system. When a turn-on command is input and power is supplied, the CPU 123 copies the O/S stored in the memory 140 to the RAM 121 according to the command stored in the ROM 122, and executes the O/S to boot the system. When the booting is completed, the CPU 123 copies various application programs stored in the memory 140 to the RAM 121 and executes the application programs copied to the RAM 121 to perform various operations. The processor 120 may perform various operations using a module stored in the memory 140.

The output unit 130 may include a display 131 for outputting a video and a speaker 132 for outputting audio.

The display 131 may display a video so that a user may view preferred content provided by the processor 120, and may additionally display a UI element to the user while displaying an image. In this case, the UI element may be a phrase requesting a selection from the user, and may be a menu displaying a plurality of preferred contents. The UI element is not limited to any specific content and may be an interface that may be recognized separately from the content.

The display 131 may be implemented as a liquid crystal display (LCD), a plasma display panel (PDP), organic light emitting diodes (OLED), or the like, and may be implemented as a touch screen.

The speaker 132 is configured to output audio. The speaker 132 is an acoustic device that converts electrical signals into vibrations of a diaphragm and generates small waves in the air to copy sound waves, and may output voice data.

The memory 140 may be implemented as a non-volatile memory, a volatile memory, a flash-memory, a hard disk drive (HDD) or a solid state drive (SSD). Meanwhile, the memory may be implemented not only as a storage medium in an electronic device, but also as an external storage medium, for example, a micro SD card, a USB memory, a web server, or the like through a network.

The tuner 150 may receive video, audio, and data in a frequency band corresponding to a channel number corresponding to a user input.

The tuner 150 may receive broadcast signals from various sources, such as terrestrial broadcast, cable broadcast, or satellite broadcast. The tuner 150 may receive broadcast signals from various sources, such as analog broadcast, digital broadcast, or the like.

The tuner 150 may be implemented as an all-in-one with the electronic device 100 or a separate device (e.g., a set-top box, a tuner connected to the port unit 170) having a tuner unit connected to the electronic device 100.

The tuner 150 may select a broadcast signal received by wire or wireless by tuning only a frequency of a channel to be received by the electronic device 100 among many radio wave components through amplification, mixing, resonance, or the like. The broadcast signal may include video, audio, and additional data (e.g., electronic program guide (EPG)).

The microphone 160 may receive a voice input and directly recognize the voice, or transmit the input voice to an external server performing voice recognition to receive the voice recognition result. In addition, the microphone 160 may receive a sound signal as well as a human voice. The sound signal transmitted from the microphone 160 may be received, and a sound signal in an inaudible region as well as a sound signal in an audible region may be received.

The microphone 160 may convert information on the received sound into an electrical signal.

The microphone 160 may include various components such as a microphone that collects user voice in analog form, an amplifier circuit that amplifies the collected user voice, an A/D converter circuit that samples the amplified user voice and converts it into a digital signal, a filter circuit that removes noise components from the converted digital signal, or the like.

The port unit 170 is configured to be connected to an external device. The port unit 170 may include at least one of a high-definition multimedia interface port 171 (HDMI) input port, a component input jack 172, and a USB port 173. In addition to the illustration, the port unit 170 may include at least one of ports such as RGB, DVI, HDMI, DP, thunderbolt, or the like. It is possible to transmit information on the recommended service to an external device through the port unit 170.

The operation input unit 180 may receive a user's selection for the preferred content displayed on the display 131. The operation input unit 180 may be implemented as a device such as a button, a touch pad, a mouse, and a keyboard, or may also be implemented as a touch screen capable of performing the display function described above and operation input function.

The electronic device 100 may perform an operation of receiving a video, detecting a frame having a predetermined object in the video, and extracting information included in the detected frame by using the configuration described above. A method of sensing a predetermined object will be described with reference to FIGS. 3 to 5.

Figure 3:
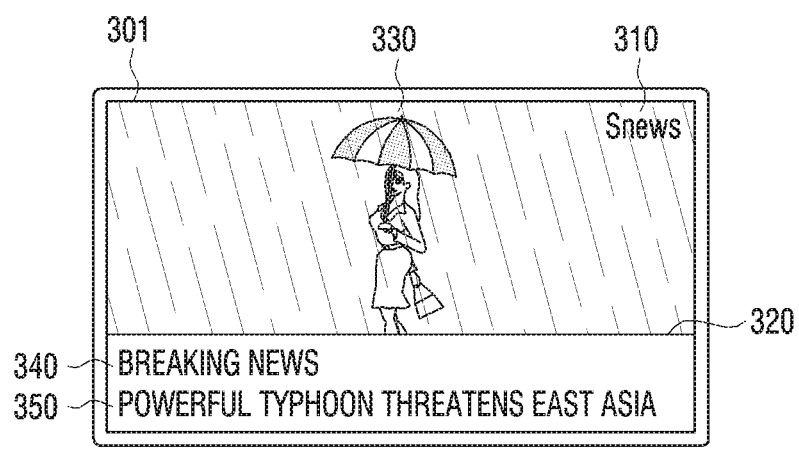
Figure 5:
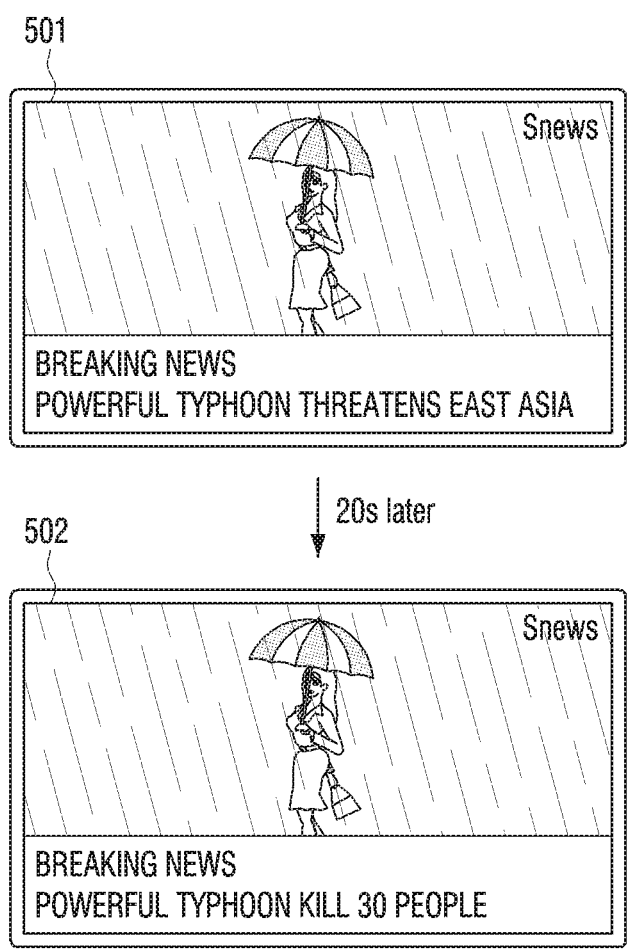

FIGS. 3 to 5 are views illustrating a predetermined object included in a video.

FIG. 3 is a view illustrating a predetermined object included in a video according to an embodiment of the disclosure.

Referring to FIG. 3, a specific frame in a received video may include information such as a company name 310 providing content, an edge area 320, an image 330, text 340 and 350, or the like.

The company name 310 that provides the content may generally exist at the same position and a pixel value may remain the same. The electronic device 100 may identify a portion detected in the frame for a long time with the same pixel value at the same position as the company name 310 providing the content.

The edge area 320 may be a boundary of an area representing an outline with a discontinuous pixel value. A discontinuity in the image has a step discontinuity and a line discontinuity. The step discontinuity is a place where a brightness of the video changes suddenly, and the outline corresponding to this is called a step edge. The line discontinuity is a place where the brightness of the video suddenly changes, but returns after a short time. The operation corresponding to this is called a line edge. The edge area 320 may include both the step edge and the line edge described above.

The electronic device 100 may use automatic content recognition (ACR) technology to identify the images 330 and texts 340 and 350.

For this operation, the automatic content recognition (ACR) technology may be used. The automatic content recognition function is a technology that enables a user to automatically find and purchase a product's price, manufacturer, etc. when a content that a user is interested in appears while using a smart TV, smartphone, smart PC, game machine, or the like. Users may find their desired contents such as video, voice, or the like by using the automatic content recognition function, and search is possible based on pre-input data included in video, or the like.

In addition, an optical character reader (OCR) function may be used to extract text information. The OCR function refers to a function of converting information in the form of letters, numbers, or other symbols into an encoded electrical signal suitable for a digital computer.

On the other hand, visual understanding is a technology of recognizing and processing objects as human vision, and may include object recognition, object tracking, human recognition, scene understanding, spatial understanding, image improvement, or the like.

An object detection technology based on neural net may be used to extract image information.

The object detection technology may be a computer vision technology for accurately finding an object type and its bounding box. In general, a candidate area for an object to be detected is searched, and a type and position of the object for the candidate area are predicted through a trained model in order to recognize an object of interest in a video. For this process, a video and an object class (class) and object bounding box information in the video are required. Object detection technology based on deep learning may be used a lot for recognition of faces, pedestrians and vehicles on the road, or the like.

The electronic device 100 may extract information on an image of the received video using the object detection technology.

Figure 8:
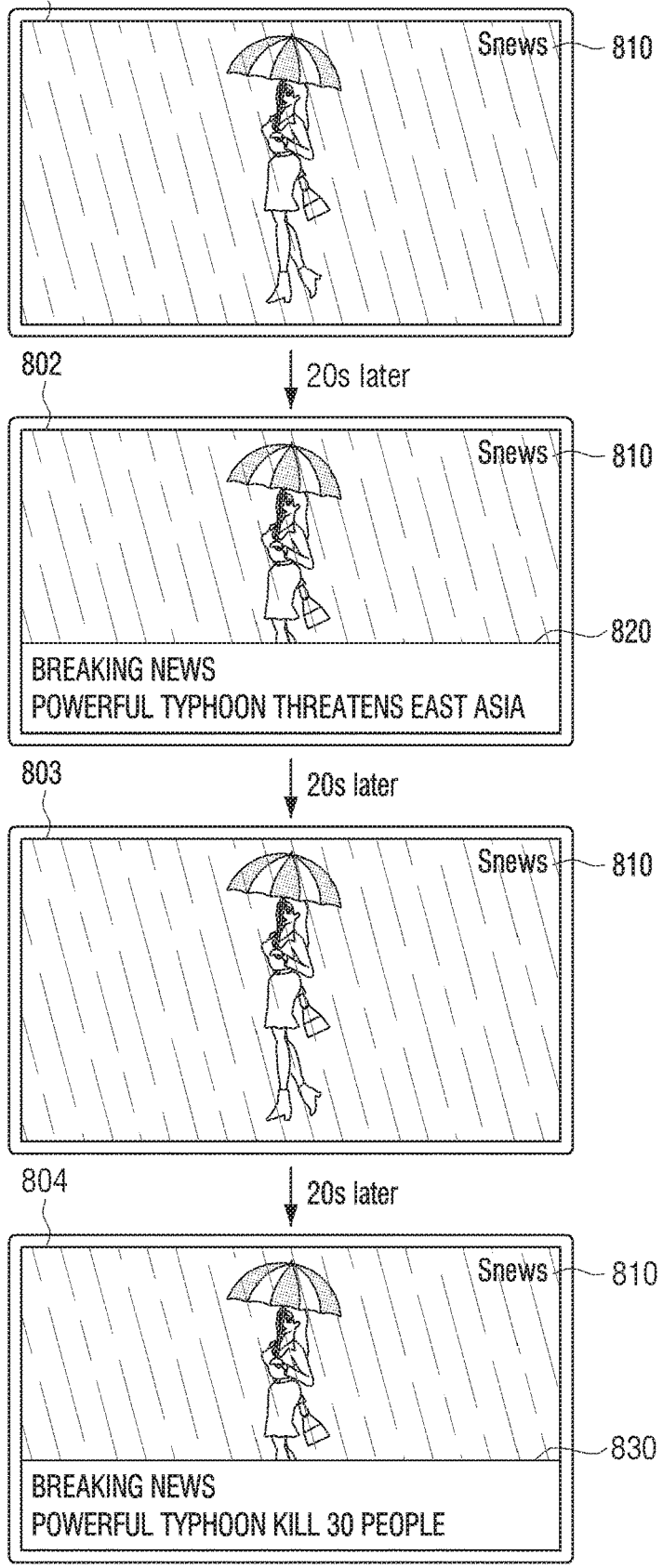
FIG. 8 is a view illustrating a video that a specific object is displayed at a fixed position.

Referring to FIG. 8, the electronic device 100 may extract an image 330 and extract image contents such as an umbrella, a woman, and rain using the technologies described above. In addition, texts "BREAKING NEWS" 340 and "POWER POWERFUL TYPHOON THREATENS EAST ASIA" 350 may be extracted for text information. In addition, a part "Snews" may be extracted as text information. The electronic device 100 may identify that "Snews" is the company name 310. Among the text information, the electronic device 100 may identify a part displayed with the same text for a certain period of time as the company name.

Meanwhile, although not illustrated, it may be identified as a company name, or the like when information about a trademark, such as "TM", "R", or the like is displayed or when there is an indicator indicating a company.

Also, the electronic device 100 may identify a company name by comparing the company name included in the pre-stored data with the extracted information.

It has been described that the electronic device 100 performs an operation of identifying whether a predetermined object is included in a corresponding frame before extracting text and image information.

The reason that the electronic device 100 identifies the predetermined object is that extracting image and text information for a specific frame rather than all frames is a way to efficiently use memory.

Referring to FIG. 3, the predetermined object may be the edge region 320. In general, in order to display text information, text may be added within a specific outline, such as a specific edge area 320. Therefore, when the predetermined object is set as the edge area 320, information may be extracted only when the edge area 320 is detected from the received video.

For example, only the frame having the edge area 320 may extract information, and other frames may not extract information. However, this is only an example, and the predetermined object may set other additional objects in addition to the edge area 320. Also, there may be several predetermined objects.

Up until now, the predetermined object has been expressed as the edge area 320, but a case in which the edge area 320 is greater than or equal to a predetermined length may be further limited, and the case may mean that the edge area 320 is formed in a straight line.

FIG. 4 is a view illustrating a predetermined object according to another embodiment of the disclosure.

Referring to FIG. 4, a video in which an edge area is not detected in a frame may be received. If only the predetermined object is set as the edge area, the electronic device 100 may not extract any information from a frame 401.

A frame 402 illustrates an edge area of a new reference. In general, outlines representing the edge areas may be displayed crossing each other. The electronic device 100 may set an object displayed by crossing the outline as a predetermined object.

For example, when it is detected that the outlines representing the edge area 320 intersect vertically, the electronic device 100 may extract information on the corresponding frames 402.

The frame 402 of FIG. 4 illustrates a case where only the edge area is set as the predetermined object, but other object types may be set as the predetermined object.

The electronic device 100 may extract information on a frame in which the predetermined object is sensed. The electronic device 100 may extract information about the frame in which the predetermined object is sensed and store it in the memory.

Meanwhile, the electronic device 100 may provide specific metadata by analyzing information stored in the memory. When the electronic device 100 extracts information for each frame in which the predetermined object is sensed and provides metadata whenever the information is extracted, a large amount of metadata may be provided, which burdens the processor 120 and the memory 140.

Accordingly, the electronic device 100 may provide metadata by merging the extracted information. Detailed descriptions will be described in FIGS. 5 and 6.

FIGS. 5 and 6 are views illustrating a metadata generation operation according to an embodiment of the disclosure.

FIG. 5 is a view illustrating a frame 20 seconds after a specific frame of a received image.

The electronic device 100 may first identify whether there is a predetermined object in the received frame. It is assumed that the predetermined objects of FIGS. 5 and 6 are set as edge areas. Referring to FIG. 5, because there are edge areas in both 501 and 502 frames, it may be identified that the predetermined object is included.

The electronic device 100 may extract information for the frame 501. With respect to the frame 501, the electronic device 100 may extract image information about an umbrella, a woman, and rain and text information about "BREAKING NEWS", "POWER POWERFUL TYPHOON THREATENS EAST ASIA", and "Snews".

Also, the electronic device 100 may extract information on the frame 502 20 seconds after the frame 501 is received. With respect to the frame 502, the electronic device 100 may extract image information about the umbrella, the woman, and the rain, and text information about the "BREAKING NEWS", the "POWER POWERFUL TYPHOON KILL 30 PEOPLE", and the "Snews".

The operation of generating metadata using information extracted from frames 501 and 502 will be described.

FIG. 6 is a view illustrating metadata using information extracted from the frames 501 and 502 illustrated in FIG. 5.

Referring to FIG. 6, a table 601 may be metadata generated using information extracted from the frame 501. The metadata may include information about a content name 610, a genre 620, a subgenre 630, viewing time 640, text 650, and an image 660. The electronic device 100 may analyze the extracted information to determine the genre 620 and the subgenre 630. For example, the electronic device 100 may extract text information "Snews" and determine a genre as news using the word news.

Also, referring to FIG. 6, the table 602 may be metadata generated using information extracted from the frame 502. Compared to the table 601, a part of the text of the table 602 may be extracted differently. Therefore, the text "KILL 30 PEOPLE" may be newly extracted from the table 602. In addition, because the frame 502 is received 20 seconds after receiving the frame 501, the time information 640 may be varied.

Meanwhile, the tables 601 and 602 describe the operation of generating individual metadata using information extracted from each frame.

However, referring to FIG. 6, the table 603 may be one metadata by synthesizing information extracted for a certain time. For example, the table 603 may synthesize information extracted from the frames 501 and 502. For example, "Snews", "BREAKING NEWS" and "POWER POWERFUL TYPHOON" may be duplicated in frames 501 and 502, respectively. The electronic device 100 may recognize the duplicate text as one piece of information and generate metadata.

The electronic device 100 may generate one metadata by synthesizing information extracted for a predetermined time. For example, the electronic device 100 may extract information about the frame for a predetermined time without generating metadata directly using information extracted from a specific frame and generate metadata based on the extracted information.

When information which is common to the information extracted while extracting information about the frame, the electronic device 100 may suspend generating metadata. In addition, the electronic device 100 may generate metadata using the previously extracted information when there is no part in which the newly extracted information is common to the previously extracted information. A detailed example will be described with reference to FIG. 7.

FIG. 7 is a view illustrating an operation when a type of a received image is changed, the electronic device recognizes the change.

Referring to FIG. 7, it is assumed that a predetermined object is an area including an edge area and text information in the electronic device 100. Referring to FIG. 8, because the frame 701 includes an edge area and an area including text information, the electronic device 100 may extract information included in the frame 701.

In addition, it is assumed that 20 minutes have passed without new text being detected in a content of the frame 701. The electronic device 100 may suspend generating the metadata because no new text has been detected.

It is assumed that 20 minutes have passed after the frame 701 was received and a new type of frame 703 is received. The electronic device 100 may extract information on a frame 703 having an area including text information.

The information extracted from the frame 703 may be texts "ABCD", "Golf is life" and images "golf", a "male", "<A><B><C><D>".

The electronic device 100 may compare information that has been previously extracted with information that has been newly extracted to identify whether there is the same information. Because none of the information extracted from the frame 701 and the information extracted from the frame 703 match, the electronic device 100 may determine that a type of the received video (or content) has changed.

If it is identified that the type of the received video (or content) has been changed, the electronic device 100 may generate metadata about the previously extracted information. For example, when the information extracted for the frame 701 is stored in the memory and the information extracted through the frame 703 is stored in the memory, the electronic device 100 may use the information about the frame 701 to generate metadata 702.

Also, the electronic device 100 may store information extracted from the frame 703 in the memory in the same manner Thereafter, when information different from the information extracted from the frame 703 is extracted, the electronic device 100 may generate metadata 704 by using the information extracted from the frame 703.

The reason for generating metadata only in a predetermined period or in a specific condition without generating metadata for each frame is to reduce the burden on the processor 120 and the memory 140. Physically, when capabilities of the processor 120 and the memory 140 are limited and the processor 120 and the memory 140 process unnecessary information, performance thereof may be highly likely to be deteriorated.

Another embodiment will be described in order to reduce the burden on the processor 120 and the memory 140.

FIG. 8 is a view illustrating a video that a specific object is displayed at a fixed position;

Referring to FIG. 8, it is assumed that a frame 802 is received 20 seconds after a frame 801 is received, and a frame 803 and a frame 804 are received at 20 second intervals. When comparing the frames 801 to 804, a text of the "Snews" may be fixedly displayed. Also, edge areas 820 and 830 may be repeatedly displayed and then disappear.

When describing FIG. 8, it is assumed that the predetermined object is an area including an edge area and text.

When the frame 801 is received, the electronic device 100 may identify the area including the text as the predetermined object and extract information. In this case, the electronic device 100 may extract text information 810 called "Snews".

Also, when the frame 802 is received, the electronic device 100 may identify an area 810 and an edge area 820 including text as predetermined objects and extract information. In this case, the electronic device 100 may extract text information with respect to "BREAKING NEWS", "POWER POWERFUL TYPHOON THREATENS EAST ASIA", and "Snews".

Similarly, in the frames 803 and 804, the electronic device 100 may continuously extract text information 810 with respect to the "Snews" while content of the corresponding video is provided. Because it is assumed that the predetermined object is set to an area including text information, the electronic device 100 may extract information for all received frames. This may be a significant burden on the processor 120 and the memory 140 and may be an operation in which unnecessary information is continuously extracted.

Therefore, the electronic device 100 may not identify a specific object that is fixedly displayed as the predetermined object. For example, if the electronic device 100 has already extracted text information for an area containing text, the electronic device 100 may not identify the same area as the predetermined object.

For example, if the electronic device 100 extracts the text information 810 with respect to the "Snews" in the frame 801, when a pixel value corresponding thereto is sensed in the frame 802, it may be estimated as the same content. The electronic device 100 may not identify an area including "Snews" as the predetermined object with respect to the frame 802.

Because the edge area 820 exists in the frame 802, the electronic device 100 may extract information about the frame 802. However, as for the frame 803, because the area including "Snews" is not determined as the predetermined object, the electronic device 100 may not extract any information.

Also, the electronic device 100 may not identify the area including "Snews" as the predetermined object with respect to the frame 804, but may identify the edge area 830 as the predetermined object. Accordingly, the electronic device 100 may extract information with respect to the frame 804.

Meanwhile, because the edge areas 820 and 830 are not fixedly included in the frame unlike the "Snews", the edge areas 820 and 830 may continue to be predetermined objects.

In general, even if the edge area is fixedly displayed, text information may be continuously changed, so that it may be set not to be excluded from the predetermined object by a user setting.

Figure 9:
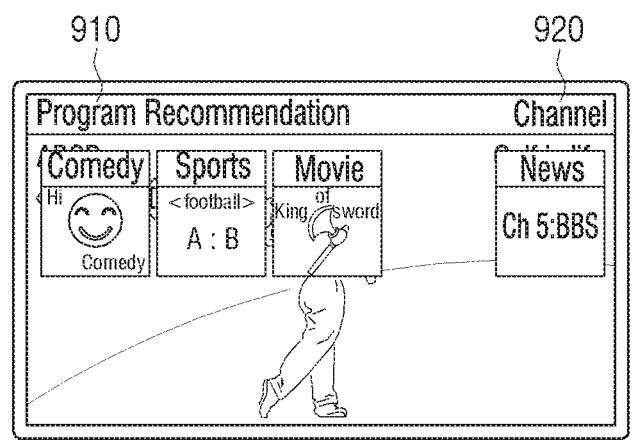
FIG. 9 is a view illustrating a method of recommending a preferred content according to an embodiment of the disclosure.

FIG. 9 is a view illustrating a method of recommending a preferred content according to an embodiment of the disclosure.

Referring to FIG. 9, when the type of the received video (or content) is changed, the electronic device 100 may recommend a preferred content to the user.

Meanwhile, inference prediction is a technology for logically inferring and predicting information by identifying information, and includes knowledge/probability-based reasoning, optimization prediction, preference-based planning, recommendation, or the like.

The operation of the electronic device 100 identifying that the type of the received video (or content) is changed has been described in FIG. 7.

When the electronic device 100 senses that the received video (or content) has been changed using the method described in FIG. 7, the electronic device 100 may provide a UI 910 and 920 displaying information about the new content. The UI may recommend a specific program 910 and a channel 920 which is currently being aired.

Up until now, the embodiment that the user stores a specific object as a predetermined object has been described, but the predetermined object may be stored by artificial intelligence learning.

Figure 10:
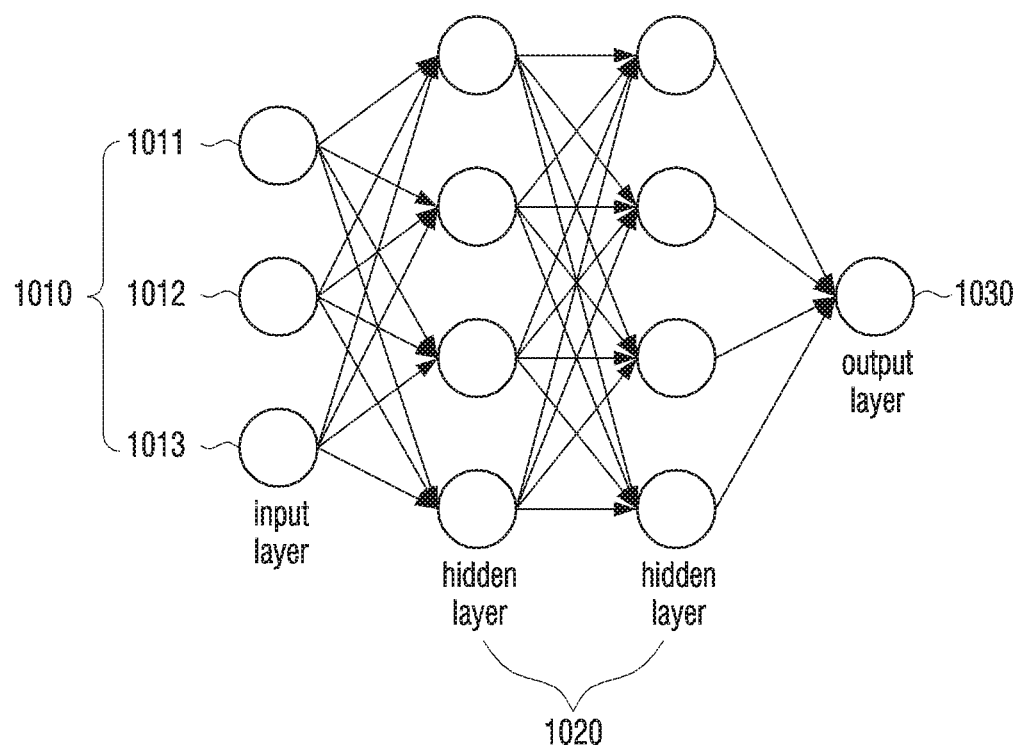
FIG. 10 is a view illustrating a learning model according to an embodiment of the disclosure.

FIG. 10 is a view illustrating a learning model according to another embodiment of the disclosure.

Referring to FIG. 10, the predetermined object setting of the disclosure may be performed by a machine learning-based recognition system, and may be a classification system based on neural networks based on a series of machine learning algorithms, and deep learning-based recognition system will be described as an example.

For example, the deep learning-based recognition system may include at least one classifier, and the classifier may correspond to one or a plurality of processors 120. The processor 120 may be implemented as an array of a plurality of logic gates, or may be implemented as a combination of a general-purpose microprocessor and a memory 130 storing programs that may be executed in the microprocessor. The classifier may be implemented as a neural network-based classifier, a support vector machine (SVM), an Adaboost classifier, a Bayesian classifier, a perceptron classifier, or the like. Hereinafter, the classifier of the disclosure will be described with respect to an embodiment implemented as a convolutional neural network (CNN)-based classifier. The neural network-based classifier is a computational model implemented to mimic the computational capability of a biological system by using a large number of artificial neurons connected by a connection line, and may perform a human cognitive or learning process through the connection line having a connection strength (weight). However, the classifier of the disclosure is not limited thereto, and of course, may be implemented as the various classifiers described above.

A general neural network may include an input layer 1010, a hidden layer 1020, and an output layer 1030, and the hidden layer 1020 may be composed of one or more layers as necessary, and may be an algorithm for training the neural network to use a back-propagation algorithm.

When any data is input to the input layer 1010 of the neural network, the classifier may train the neural network such that output data for the input learning data is output to the output layer 1030 of the neural network. When the feature information extracted from the received frame is input, the classifier may classify a pattern of feature information into any one of several classes using the neural network, and may output a classification result.

The input layer 1010 may be various objects of the received frame. For example, nodes 1011, 1012, and 1013 of the input layer 1010 may be an object representing an area including text, an object representing an edge area, an object displaying static text or an image, and the like. The example described above of the input layer 1010 is only for illustration, and is not meant to be limited thereto. In other words, the number of nodes in the input layer 1010 may be changed according to a user's setting.

Referring to FIG. 10, three nodes 1011, 1012, and 1013 of the input layer 1010 are illustrated, but this may be changed.

Various objects included in the received frame may correspond to the input layer 1010. The output layer 1030 may be whether text or image information is extracted.

For example, the electronic device 100 may check whether an object included in a frame includes text or image information through various objects included in the received video.

The electronic device 100 may learn based on whether the object included in the frame includes text or image information.

Meanwhile, because the electronic device 100 needs to determine whether the object includes text or image information based on the object included in the frame, the electronic device 100 uses a deep learning based recognition system as a classification system by a series of machine learning algorithms based on the neural networks.

In addition, although the hidden layer 1020 is expressed in two stages in FIG. 10, it may be a classification system composed of the first stage hidden layer only. Also, the number of nodes included in the hidden layer 1020 may also be changed.

Referring to FIG. 10, the electronic device 100 may automatically store a meaningful object as a predetermined object through learning by artificial intelligence technology even if the user does not predetermine the predetermined object.

Figure 11:
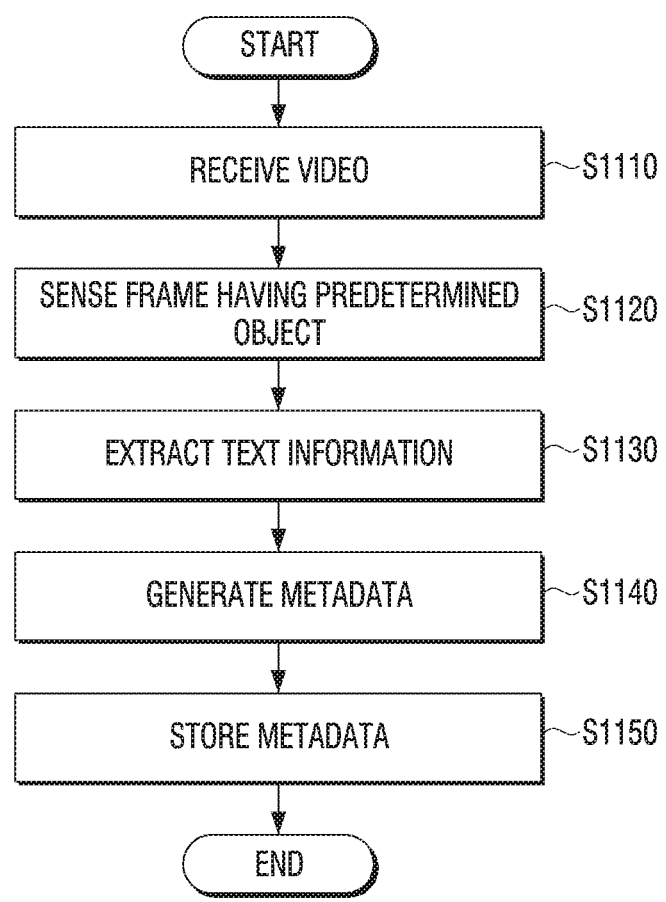
FIG. 11 is a flowchart illustrating a control method of an electronic device according to an embodiment of the disclosure.

FIG. 11 is a flowchart illustrating a control method of an electronic device according to an embodiment of the disclosure.

Referring to FIG. 11, a control method of the electronic device 100 may receive a video composed of a plurality of frames (S1110).

The control method of the electronic device 100 may sense a frame having a predetermined object in the received video (S1120). In this case, when an edge area is detected and if the detected edge area is greater than or equal to a predetermined length, it may be identified that the predetermined object is included.

The control method of the electronic device 100 may extract information from the sensed frame (S1130). The control method of the electronic device 100 may extract information by sensing text included in the frame. In addition, the electronic device 100 may extract an object image included in the frame, and extract object information with respect to the extracted object image as information. Also, if the object included in the frame is text, the text itself may be extracted as information, and if the object included in the frame is an image, a content of the image may be extracted as information. Meanwhile, it may be determined that the content has been changed if there is no common information by comparing information extracted from different frames.

The control method of the electronic device 100 may generate metadata using the extracted information (S1140). Meanwhile, the control method of the electronic device 100 may generate one metadata by merging information extracted from different frames. The control method of the electronic device 100 may generate metadata including at least one of company information, time information, and genre information using the extracted information.

The control method of the electronic device 100 may store the generated metadata (S1150).

In addition, the control method of the electronic device 100 may further include detecting metadata included in the video, and modifying the metadata extracted by comparing the detected metadata and the extracted information.

The control method of the electronic device 100 may select the preferred content using the stored metadata.

As described above, the control method of the electronic device 100 according to an embodiment of the disclosure may extract only from a frame including a predetermined object among the received frames, thereby reducing the burdens to the processor 120 and the memory 140.

Because information is extracted only for a specific frame, unnecessary information is not stored in the memory 140, so an accuracy of the analysis result (e.g., metadata) may be increased.

In addition, the control method of the electronic device 100 may store accurate information in real time through an operation of modifying metadata transmitted from the outside.

Various embodiments described above may be implemented in a recording media that may be read by a computer or a similar device to the computer by suing software, hardware, or a combination thereof. In a hardware configuration, various embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and an electrical unit for performing other functions. In some cases, the embodiments described herein may be implemented by the processor itself. In a software configuration, various embodiments described in the specification such as a procedure and a function may be implemented as separate software modules. The software modules may respectively perform one or more functions and operations described in the present specification.

According to various embodiments described above, computer instructions for performing processing operations of a device according to the various embodiments described above may be stored in a non-transitory computer-readable medium. The computer instructions stored in the non-transitory computer-readable medium may cause a particular device to perform processing operations on the device according to the various embodiments described above when executed by the processor of the particular device.

The non-transitory computer-readable medium does not refer to a medium that stores data for a short period of time, such as a register, cache, memory, etc., but semi-permanently stores data and is available of reading by the device. For example, the non-transitory computer-readable medium may be CD, DVD, a hard disc, Blu-ray disc, USB, a memory card, ROM, or the like.

While the disclosure has been shown and described with reference to various embodiments thereof, it is not limited thereto, and will be understood by those skilled in the art that various changes in form and details may be made therein without departing from the spirit and scope of the disclosure as defined by the appended claims and their equivalents. These changes should not be individually understood from the technical spirit or prospect of the disclosure.

What is claimed is:

1. An electronic device comprising:
   a memory;
   a communicator configured to receive a video comprising a plurality of frames; and
   a processor configured to:
      identify a frame having at least one text in the received video,
      extract text information based on an object included in the identified frame,
      generate metadata based on the extracted text information, and
      store the generated metadata in the memory,
   wherein the at least one text is a text of an edge area within an outline,
   wherein the processor is further configured to:
      based on the detected edge area being greater than or equal to a predetermined length, identify that the at least one text is included, and
      generate one metadata by merging text information extracted from different frames.

2. The electronic device as claimed in claim 1, wherein the processor is configured to:
   compare text information extracted from different frames, and
   identify that a content has been changed based on no common text information being identified.

3. The electronic device as claimed in claim 1, wherein the processor is configured to identify text included in the frame to extract text information.

4. The electronic device as claimed in claim 1, wherein the processor is configured to:
   extract an object image included in the frame, and
   obtain the object with respect to the extracted object image.

5. The electronic device as claimed in claim 4, wherein the processor is configured to:
   extract text itself as text information based on the object included in the frame being text, and
   extract a content that the image refers to based on the object included in the frame being an image.

6. The electronic device as claimed in claim 1, wherein the processor is configured to generate metadata including at least one among company information, time information, or genre information based on the extracted text information.

7. The electronic device as claimed in claim 1, wherein the processor is configured to:
   detect metadata included in the video, and
   compare the detected metadata with the extracted text information in order to modify the detected metadata.

8. The electronic device as claimed in claim 1, wherein the processor is configured to select preferred content based on the stored metadata.

9. A control method of an electronic device comprising:
   receiving a video comprising a plurality of frames;
   identifying a frame having at least one text in the received video;
   extracting text information based on an object included in the identified frame;
   generating metadata based on the extracted text information; and
   storing the generated metadata,
   wherein the at least one text is a text of an edge area within an outline,
   wherein the method further comprises:
   based on the detected edge area being greater than or equal to a predetermined length, identifying that the at least one text is included, and
   generating one metadata by merging text information extracted from different frames.

10. The method as claimed in claim 9, further comprising:
    comparing text information extracted from different frames and identifying that a content has been changed based on no common text information being identified.

11. The method as claimed in claim 9, wherein the extracting comprises identifying text included in the frame to extract text information.

* * * * *